2 Sheets—Sheet 1.

S. W. MOORE.
Harvester.

No. 215,017.  Patented May 6, 1879.

Attest:
C Clarence Poole

Inventor:
Samuel W. Moore
by Ellis Spear
Atty.

2 Sheets—Sheet 2.

S. W. MOORE.
Harvester.

No. 215,017. Patented May 6, 1879.

Attest:
C. Clarence Poole

Inventor:
Samuel W. Moore
by Ellis Spear
Atty

UNITED STATES PATENT OFFICE.

SAMUEL W. MOORE, OF LAMBERTVILLE, NEW JERSEY, ASSIGNOR TO HIMSELF AND JOHN VICKENHISER, OF SAME PLACE.

IMPROVEMENT IN HARVESTERS.

Specification forming part of Letters Patent No. 215,017, dated May 6, 1879; application filed February 27, 1879.

*To all whom it may concern:*

Be it known that I, SAMUEL W. MOORE, of Lambertville, in the county of Hunterdon and State of New Jersey, have invented an Improvement in Harvesters, of which the following is a specification.

My invention relates to the knives on a cutter-bar of a harvester and their immediate connections, and to the means for communicating motion to the said knives.

The specific details of construction which constitute my invention will be particularly described in their proper relation and order, and pointed out in the claim.

Figure 1:
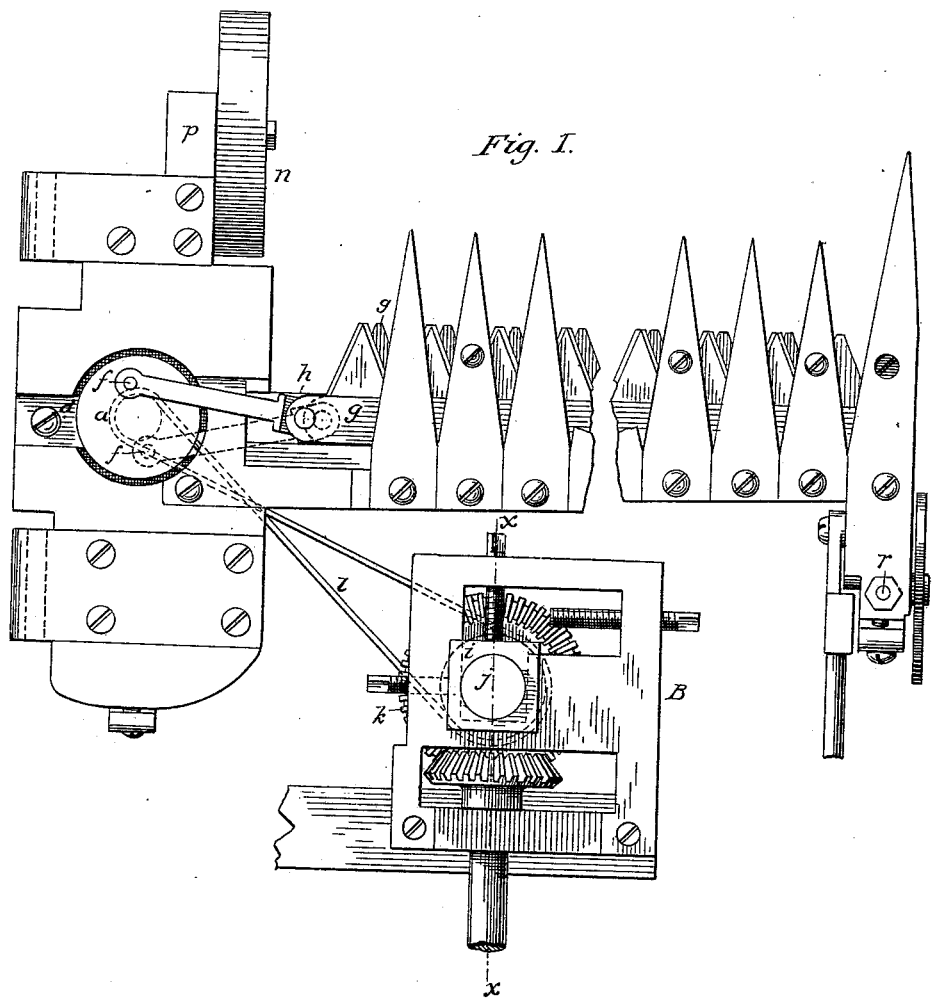
Figure 2:
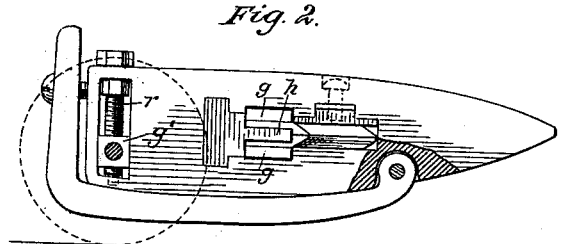
Figure 3:
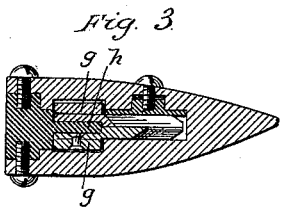
Figure 4:
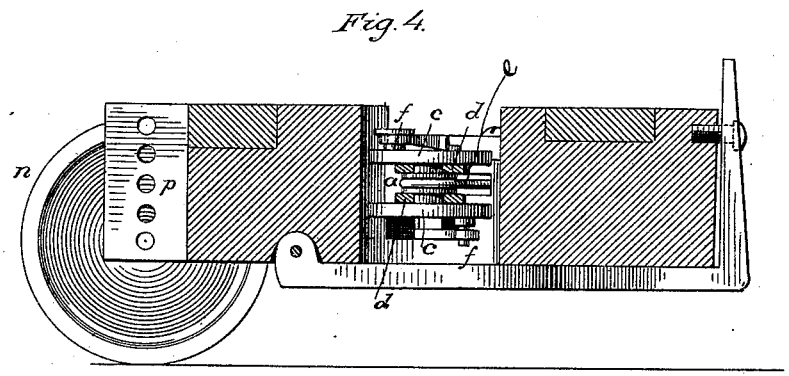
Figure 5:
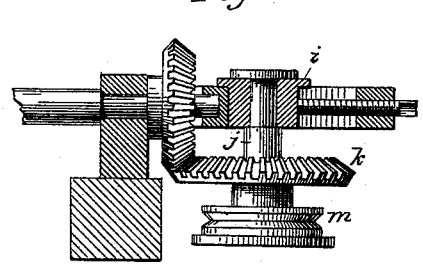

In the drawings hereunto attached and forming part of this specification, Figure 1 is a plan view of so much of a harvester as is necessary to illustrate my invention. Fig. 2 is a side view of the shoe at the outer end of the cutter-bar. Fig. 3 is a transverse vertical section through the said cutter-bar. Fig. 4 is a longitudinal section through the center of the shoe at the inner end of the cutter-bar, the part to which the wheel is attached being shown in elevation. Fig. 5 is a section through line $x$ $x$ of Fig. 1, showing the gearing and band-pulley for driving the knives.

In my improved machine I dispense with the ordinary rigid pitman, which is objectionable, among other reasons, on account of the noise, and the positive unyielding motion which it gives to the knives, causing them sometimes to break or be seriously dulled when they come in contact with fragments of rock or any similar hard substance. Instead of this rigid pitman, I use a band of any suitable flexible material, in connection with a pulley upon the frame and another upon the shoe of the cutter-bar. The driving-pulley upon the shoe is shown at $a$, in Figs. 1 and 4, in the manner in which I have embodied the invention as represented in the drawings. This pulley is made with a wheel or face-plate, $c$, fixed upon each side. It is mounted upon a divided bearing, $d$, within a recess in the shoe. The bearing is divided, as shown at $e$, Fig. 4, to permit the passage of the band around the pulley. On opposite sides of these face-plates are wrist-pins $f$ $f$, which are connected by short pitmen to the knives $g$ $g$, one pitman being located above the finger-bar and the other below.

The knives, it will be observed, are doubled, and have an alternately reciprocating movement. They are separated from each other by a flange upon the finger-bar, (shown at $h$,) the knives being rabbeted, as shown in Fig. 3, to allow their inner faces to pass in contact with each other. This separating-band obviates any liability of binding, and prevents the rivets from catching upon one another. The sickles are made of the same size throughout their entire length, and need not be enlarged for connection with the pitman. They may, therefore, be readily removed at the outer end of the finger-bar through the opening in the shoe.

Located at some suitable point upon the frame of the machine is a small metallic frame, B. (Shown more clearly in Fig. 1.) Within this is mounted a bearing-block, $i$, which carries a shaft, $j$, on which are a beveled gear, $k$, and pulley $m$. The block is suspended in the metallic frame in the manner clearly shown in the drawings, and the frame is provided with set-screws, by which the block may be adjusted in different directions for the purpose of tightening the plate.

The beveled gear $k$ receives its motion from another beveled journal at right angles thereto, the latter receiving its motion in any suitable way from the driving-wheels.

The pulley $m$ is connected to the pulley in the shoe by a band, $l$. Each band passes through suitable openings formed in the shoe, these holes being made at an inclination, and in a position to suit the position of the pulley $m$. The band serves to drive the knives with power sufficient to overcome the resistance of the material to be cut, but will slip, and thus save the knives from serious damage, when they come in contact with any hard substance in their passage over the field.

The forward end of the inner shoe is supported on a friction-roller, $n$, which has its bearing in the vertical flange $p$. This is made with series of holes, screw-threaded for vertical adjustment of the friction-roller.

Another friction-roller is shown in the rear end of the outer shoe, as appears more clearly in Fig. 2. This shoe has its bearing in a block, $g'$, adjustable vertically by means of the set-screws $r$. The inner shoe may be hinged to the machine and braced in any suitable manner.

I am aware that double knives in themselves are not new; and I am also aware that adjustable blocks or bearings have been heretofore shown for the purpose of tightening the pulley; and I limit my claims in view of the admitted state of the art.

Having thus described my invention, what I claim, and desire to secure by Letters Patent of the United States, is—

The combination, in a harvester, of the double knives, separated by the flange $h$ of the pulley $a$ in a recess in the shoe, having on its shaft face-plates which carry wrist-pins, of the pitmen connecting the wrist-pins to the knives, and of a rope or chain communicating motion from a pulley on the main frame to the pulley in the shoe, as set forth.

In testimony whereof I have signed my name to this specification in the presence of two subscribing witnesses.

SAMUEL W. MOORE.

Witnesses:
J. HESTON SMITH,
WM. E. NAYLOR.